United States Patent [19]

Glineur

[11] 4,330,521

[45] May 18, 1982

[54] PROCESS FOR THE MANUFACTURE OF AQUEOUS SOLUTIONS OF ALKALI METAL HYPOCHLORITE

[75] Inventor: Willy Glineur, Brussels, Belgium

[73] Assignee: Solvay & Cie, Brussels, Belgium

[21] Appl. No.: 167,132

[22] Filed: Jul. 9, 1980

[30] Foreign Application Priority Data

Jul. 16, 1979 [FR] France .................. 79 18548

[51] Int. Cl.³ .......................... C01B 11/04
[52] U.S. Cl. ................ 423/473; 23/230 A;
422/62; 364/502; 364/118; 364/194
[58] Field of Search ............ 423/473; 23/230 A;
422/62; 364/118, 105

[56] References Cited

U.S. PATENT DOCUMENTS

| | | | |
|---|---|---|---|
| 3,199,949 | 8/1965 | Clerbois | 423/473 |
| 3,880,348 | 8/1975 | Salihbegovic | 364/105 |
| 4,025,763 | 5/1977 | Klein | 364/118 |
| 4,069,413 | 1/1978 | Rutledge | 364/118 |

OTHER PUBLICATIONS

Pollard, "Process Control for the Chemical and Allied Fluid Processing Industries", American Elsevier, N.Y., (1971), pp. 105, 111–113.

Primary Examiner—Brian E. Hearn
Attorney, Agent, or Firm—Robert E. Burns; Emmanuel J. Lobato; Bruce L. Adams

[57] ABSTRACT

The invention concerns a process and an apparatus for the manufacture of aqueous solutions of alkali metal hypochlorite.

The apparatus comprises a reaction vessel in which chlorine is caused to react with a solution of alkali metal hydroxide and a control device adapted so as to regulate the relative weights of chlorine and alkali metal hydroxide for the reaction, as a function of the derivative, with respect to time, of the redox potential of the reaction, modulated by an instantaneous value of this potential.

4 Claims, 1 Drawing Figure

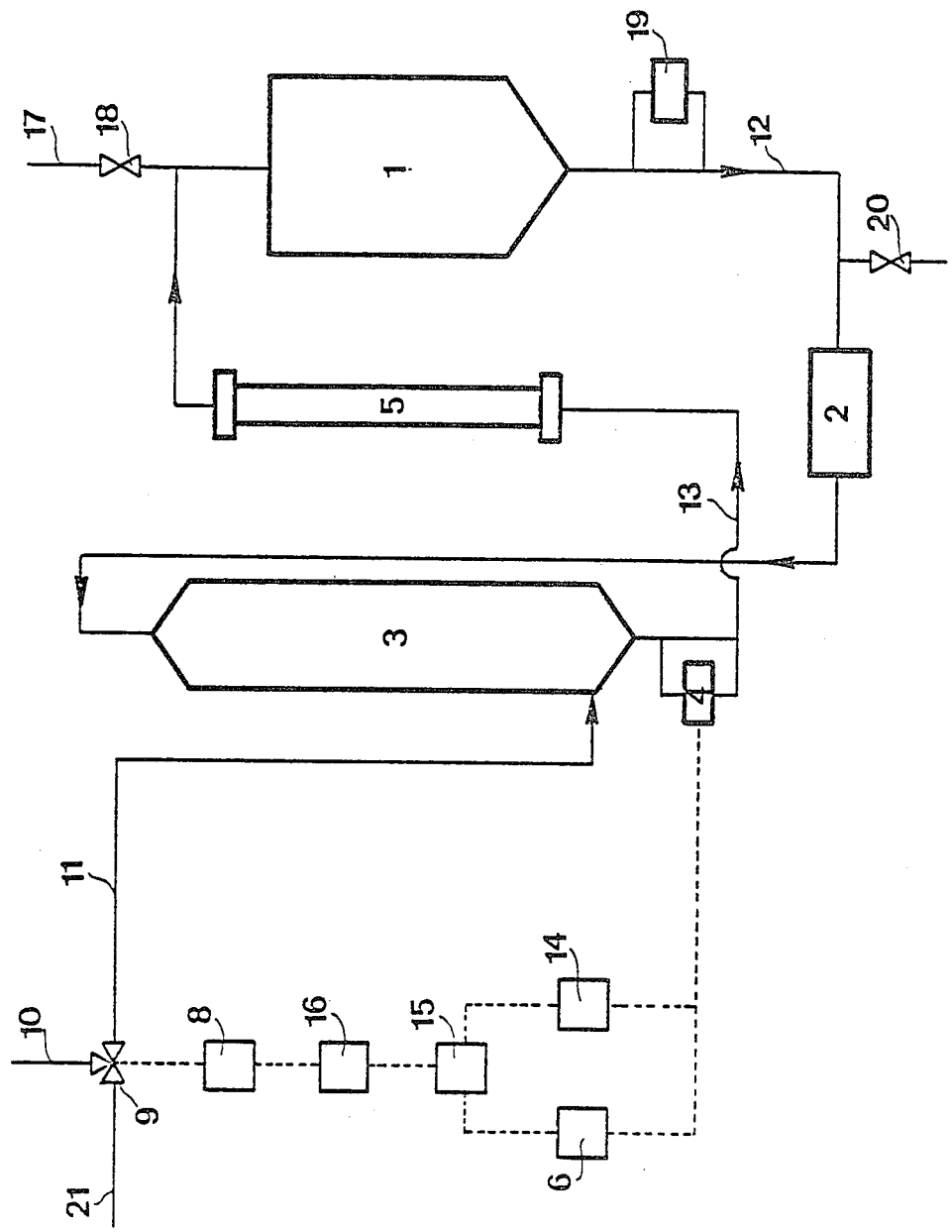

PROCESS FOR THE MANUFACTURE OF AQUEOUS SOLUTIONS OF ALKALI METAL HYPOCHLORITE

BACKGROUND OF THE INVENTION

The present invention has for its aim the production of aqueous solutions of alkali metal hypochlorite and in particular sodium hypochlorite.

A common procedure used to manufacture aqueous solutions of alkali metal hypochlorite consists of reacting gaseous chlorine with an aqueous solution of alkali metal hydroxide according to the general reaction:

$$Cl_2 + 2NaOH \rightarrow NaClO + NaCl + H_2O$$

The operation of this process is difficult because of the generally unstable nature of solutions of alkali metal hypochlorite. To avoid rapid decomposition of the solutions of alkali metal hypochlorite it is necessary to maintain continuously a substantial excess of alkali metal hydroxide in the reaction mixture. It is difficult to adhere to this condition in the case where the process is carried out as a batch process. Indeed in the carrying out of the batch process an aqueous solution of hydroxide and hypochlorite of alkali metal is made to circulate between a tank containing an aqueous solution of the alkali metal hydroxide and a reaction vessel into which chlorine is introduced; the solution in the reaction vessel is thus progressively enriched in alkali metal hypochlorite and it is, in consequence, convenient to control its composition continuously and accurately, so as to reduce the chlorine flow at the proper time and to terminate it as soon as the percentage of alkali metal hydroxide in the reaction mixture falls below a critical predetermined value.

To check the change of the pH or the alkali metal hydroxide content of the reaction mixture, it has been proposed in U.S. Pat. No. 3,199,949 filed on July 10, 1962 in the name of Clerbois et al, to follow the change of the derivative, with respect to time, of the oxidation-reduction (or redox) potential of the reaction mixture.

This known method of control has been proved accurate and reliable in the case of plants operating steadily, fed with controlled amounts of chlorine and alkali metal hydroxide. It is however poorly adapted to the control of a process for the manufacture of alkali metal hydroxide in plants operating under unsteady conditions, such as plants in which the chlorine supply undergoes uncontrollable fluctuations. This is generally the case of plants which are fed by waste chlorine derived from the liquefaction of the chlorine gas produced in cells for the electrolysis of sodium chloride brine.

Such uncontrollable fluctuations in the chlorine feed, which can sometimes be of considerable size are often the cause of corresponding variations in the derivative of the redox potential of the reaction mixture, even when the alkali metal hydroxide content of this is high. These fluctuations are likely in certain cases to act unfavourably on the operating control of the plant, for example by a sudden cessation of the chlorine flow to the reaction vessel.

SUMMARY OF THE INVENTION

The invention is aimed at overcoming these cited difficulties. It aims more particularly at providing a process and a plant for the production of aqueous solutions of alkali metal hypochlorite in which the progress of the reaction of chlorine with the solution of alkali metal hydroxide is followed continuously by an accurate control method, which is reliable and independent of accidental variations in the flow rates and compositions of the flows of chlorine and alkali metal hydroxide solution.

The invention concerns therefore a process for the manufacture of aqueous solutions of alkali metal hypochlorite, wherein chlorine is reacted with an aqueous solution of alkali metal hydroxide, and the relative weights of chlorine and alkali metal hydroxide for the reaction are controlled according to a function of the redox potential of the reaction; according to the invention the function of the redox potential of the reaction is the derivative, with respect to time, of the redox potential modulated by an instantaneous value of the said redox potential.

BRIEF DESCRIPTION OF THE DRAWING

The drawing is a flow diagram illustrating an apparatus for manufacturing an aqueous solution of alkali metal hypochlorite by reaction of chlorine with an aqueous solution of alkali metal hydroxide, which includes a control device for regulating the relative weights of chlorine and alkali metal hydroxide in the reaction mixture according to the invention.

DESCRIPTION OF THE INVENTION

In the process according to the invention, the sources of chlorine and alkali metal hydroxide are not critical. The aqueous solution of alkali metal hydroxide can for example be obtained by electrolysis of an alkali metal chloride brine in a mercury cathode electrolytic cell or in an ion exchange membrane electrolytic cell.

The chlorine can also be obtained by electrolysis of an alkali metal chloride brine in a mercury cathode electrolytic cell, in a diaphragm electrolytic cell or in an ion exchange membrane cell.

The process according to the invention is however very suitable for using, as source of chlorine, the waste gas mixtures containing chlorine, in particular the waste gas mixtures from the liquefaction of the chlorine produced by the electrolysis of sodium chloride brines.

The redox potential of the reaction of chlorine with the aqueous solution of alkali metal hydroxide is well known in the art. It is usually measured by means of an electrochemical cell comprising a measuring electrode of an unattackable metal or alloy, for example platinum, and a reference electrode (generally a calomel electrode saturated in KCl, well known in the art), immersed close together in the reaction vessel.

The calculation of the derivative of the redox potential with respect to time presents no difficulties and can be carried out at any time automatically by analog or numerical computers.

In the process, according to the invention, the choice of the mathematical function by which the derivative of the redox potential is modulated, is imposed by the choice of the aforesaid instantaneous value of the redox potential. In a general way, the modulation chosen should be such that its response should be little influenced by accidental fluctuations taking place in the flow rates of the chlorine or the alkali metal hydroxide. According to the value chosen to express the redox potential, the modulation can for example be a multiplication, a division or an exponential function. In carrying out the process according to the invention the value chosen to express the redox potential may be the redox potential itself expressed for example in mV, such as it is measured by the electrochemical measuring cell described hereabove.

According to one preferred embodiment of the invention the value chosen to express the redox potential is the antilog of the redox potential of the reaction. Indeed variations in the pH of the reaction mixture produce corresponding variations, generally large, of the antilog of the redox potential, and this preferred embodiment of the process according to the invention has thus the advantage of markedly increasing the sensitivity of the control of the reaction. In the particular case where the value chosen to express the redox potential is the potential itself or its antilog the modulation chosen is preferably a multiplication. In this preferred embodiment of the process according to the invention, the feed of chlorine and aqueous solution of alkali metal hydroxide in the reaction mixture, is generally regulated so that the result of the multiplication of the redox potential or of its antilog by the derivative of the redox potential is at all times less than a predetermined value.

This predetermined multiplication value corresponds generally to a critical value of pH or of the sodium hydroxide content of the reaction mixture, beyond which the stability of the solutions of alkali metal hypochlorite becomes insufficient for the purpose for which they are to be used, as well as for their handling or storage. Generally the aforesaid predetermined multiplication value is chosen so that the pH in the reaction mixture is at least equal to 12 and preferably between 12.2 and 12.6.

An apparatus for the carrying out of the process according to the invention comprises, on the one hand, a reaction vessel, means for the admission of chlorine in the vessel, means for the admission of an aqueous solution of alkali metal hydroxide in the vessel and means for the removal of an aqueous solution of alkali metal hypochlorite out of the vessel and on the other hand, a regulating device of the relative flow rates of chlorine and alkali metal hydroxide, connected to a control device, said control device comprising a cell for measurement of the redox potential of the solution of alkali metal hypochlorite and an analog circuit of the derivative, with respect to time, of the potential measured by the cell; according to the invention the control device comprises, in addition, an analog circuit of the antilogarithmic function of the said potential and an analog multiplier of the respective signals from both analog circuits. In the apparatus according to the invention, the reaction vessel is not critical; it can with advantage consist of a vertical packed tower.

The regulating device of the respective flow rates of chlorine and alkali metal hydroxide solution consists generally of a valve mounted on a pipe for the admission of the alkali metal hydroxide solution in the vessel or, more usually, on a pipe for the admission of chlorine in the vessel, as described in the aforesaid U.S. Pat. No. 3,199,949. The operation of the valve can be carried out for example by means of an electric motor, or hydraulically or pneumatically.

The control device is intended to control the operation of the regulating device as a function of the pH value in the solution of alkali metal hypochlorite.

In the control device, the electrochemical cell for the measurement of the redox potential is of the type described above. It is located in the reaction vessel or in a pipe for the removal of the alkali metal hypochlorite solution out of the vessel.

Derivative and antilogarithmic function analog circuits are well known in the art. The derivative circuit is intended to emit a signal proportional to the derivative of the redox potential with respect to time; the antilogarithmic circuit is intended to emit a signal proportional to the antilogarithm of the redox potential.

The analog multiplier is also an analog circuit well known in the art. It is intended to modulate the signal emitted by the antilogarithmic circuit, so as to multiply said signal by the signal emitted by the antilogarithmic circuit, the resulting signal being transmitted to the motor of the regulating device, possibly through an amplifier.

The process and the apparatus according to the invention are concerned with the manufacture of aqueous solutions of alkali metal hypochlorite, and especially solutions of sodium hypochlorite, irrespective of whether by continuous or batch operation.

In the case of production by a continuous process, the reaction vessel is continuously fed with an aqueous solution of alkali metal hydroxide and the aqueous solution of alkali metal hypochlorite removed out of the said reaction vessel is immediately run off from the apparatus. In such a method of carrying out the invention it is advisable to control the respective flows of the solution of alkali metal hydroxide and of chlorine so that the solution of alkali metal hypochlorite which is removed out of the reaction vessel is usable as it stands and has thus a pH value and an alkali metal hypochlorite content which are suitable for the use for which it is intended.

In the case of manufacture by a batch process, an aqueous solution of alkali metal hypochlorite and alkali metal hydroxide is made to flow to and fro between the reaction vessel and a tank containing a solution of alkali metal hydroxide, and the apparatus is drained off as soon as the solution in circulation has a pH value and an alkali metal hypochlorite content which are suitable for the use for which it is intended.

Some features and details of the invention will be apparent from the following description of the attached drawing which shows diagrammatically a particular embodiment of the apparatus according to the invention.

The apparatus shown on the drawing is adapted to operate by a batch process. It comprises, to this end, a reaction vessel 3, a chlorine main 10 and a tank 1 intended to contain, when the apparatus is started-up, an aqueous solution of sodium hydroxide.

The reaction vessel 3 is preferably a packed tower. It is connected both to the chlorine main 10 via a three-way valve 9 and a pipe 11, and to tank 1 via a loop comprising a circulation pump 2, a cooler 5 and pipes 12 and 13. The actuating motor 8 for the valve 9 is connected to a control device which includes an electrochemical measuring cell 4 for the redox potential, branched as a shunt on pipe 13 downstream the reaction vessel 3, an analog derivative circuit 6 and an antilogarithmic circuit 14 both connected to the measuring cell 4, an analog multiplier 15 connected to the analog derivative circuit 6 and to the antilogarithmic circuit 14 and an amplifier 16 for the signal emitted by the multiplier 15 and transmitted to the motor 8.

Before starting-up the apparatus, tank 1 is filled with a concentrated aqueous solution of sodium hydroxide via the inlet pipe 17, and then the valve 18 is closed.

Pump 2 is then started and valve 9 is operated so that the whole of the chlorine flow from main 10 is conveyed to the base of the reaction vessel 3, via pipe 11.

The solution of sodium hydroxide circulating to and fro between the reaction vessel 3 and tank 1 becomes progressively stronger in sodium hypochlorite, and its redox potential is measured continuously at the outlet of vessel 3 by the electrochemical measuring cell 4.

The potential measured by cell 4 is handled by both circuits 6 and 14 which simultaneously emit a signal proportional to its derivative with respect to time and a signal proportional to its antilogarithm. Said signals emitted by circuits 6 and 14 are introduced into the multiplier 15 where they are multiplied one by the other.

At the start of an operating cycle for the apparatus, the redox potential is very low and varies very little, even in the case where the flow of chlorine in the main 10 undergoes uncontrollable and sudden variations. The signal emitted by the analog multiplier 15 and transmitted to the motor 8 is thus insufficient to actuate this, so that valve 9 remains fully open in pipe 11.

When the pH of the solution leaving the reaction vessel 3 approaches a critical value below which the stability of the sodium hypochlorite solution becomes inadequate (for example pH=12.3), the potential measured by cell 4 is higher and moreover undergoes appreciable changes if the pH is changing; the signal transmitted to the motor 8 is consequently sufficient for it to operate valve 9 in such a way as to reduce the chlorine flow rate in pipe 11 and even to stop this flow when the pH reaches the critical value.

The critical value for pH can be reached in the reaction vessel 3, not only at the end of the operating cycle but also in the case of an incident during operation leading to an unexpected increase in the chlorine flow rate in main 10.

A second electrochemical potential measuring cell 19, branched in parallel on the pipe 12 leaving tank 1 allows the determination of the end of the operating cycle. At this moment, pump 2 is stopped, valve 20 is operated to empty the installation, then tank 1 is refilled with a new charge of sodium hydroxide solution before starting a new operating cycle. According to an advantageous embodiment of the invention, not shown on the drawing, the third branch 21 of the valve 9 is connected to the reaction vessel of a second apparatus for the production of sodium hypochlorite, similar to that just described. The operation of the two apparatus connected to valve 9 is then adjusted so that the end of the operating cycle for one apparatus coincides with the start of the operating cycle for the other apparatus.

I claim:

1. In a process for the manufacture of aqueous solutions of alkali metal hypochlorite, wherein chlorine is reacted with an aqueous solution of alkali metal hydroxide and wherein the concentrations and amounts of the mixture of said alkali metal hydrochlorite, chlorine and alkali metal hydroxide vary with time and said amounts of chlorine and alkali metal hydroxide are regulated to maintain a slight predetermined alkalinity in the mixture to prevent decomposition of said alkali metal hypochlorite, said regulation being performed by measurements of the redox potential of said mixture, conversion of said redox potential into a signal representative of the derivative of said redox potential relative to time, and regulation by said signal of the addition of at least one of said chlorine and alkali metal hydroxide, the improvement which comprises converting said redox potential into a signal representative of either said potential itself or its antilogarithm, multiplying said signal representative of the derivative of said redox potential relative to time by said signal representative of either said redox potential itself or its antilogarithm, and regulating said addition of at least one of said chlorine and alkali metal hydroxide in order that the the signal resulting from the multiplication be maintained within a predetermined range.

2. Process according to claim 1, wherein said redox potential is converted into a signal representative of its antilogarithm.

3. Process according to claim 1, wherein said predetermined range of the modulated signal resulting from the multiplication is selected in order that the pH in said mixture is at least equal to 12.

4. Process according to claim 3, wherein said predetermined range of the modulated signal resulting from the multiplication is selected in order that the pH in said mixture is between about 12.2 and 12.6.

* * * * *